(12) United States Patent
Ventura (10) Patent No.: US 6,604,141 B1
(45) Date of Patent: Aug. 5, 2003

(54) INTERNET EXPERT SYSTEM AND METHOD USING FREE-FORM MESSAGING IN A DIALOGUE FORMAT

(76) Inventor: Diego Ventura, 1427 Platt Ave., Milpitas, CA (US) 95035

( * ) Notice: Subject to any disclaimer, the term of this patent is extended or adjusted under 35 U.S.C. 154(b) by 0 days.

(21) Appl. No.: 09/416,663

(22) Filed: Oct. 12, 1999

(51) Int. Cl.[7] ............................. G06F 17/30; G06F 15/16
(52) U.S. Cl. ............................. 709/227; 707/6; 707/10; 709/204; 706/16
(58) Field of Search ................................. 709/202, 227, 709/220, 204; 707/4, 500, 3, 10, 6; 434/350, 118, 323, 362; 704/9, 10; 706/12, 53, 46, 54, 50, 16; 714/37

(56) References Cited

U.S. PATENT DOCUMENTS

| | | | | |
|---|---|---|---|---|
| 5,243,689 A | * | 9/1993 | Yoshiura et al. | 706/12 |
| 5,333,237 A | | 7/1994 | Stefanopoulos et al. | 395/12 |
| 5,701,399 A | | 12/1997 | Lee et al. | 395/51 |
| 5,787,234 A | | 7/1998 | Molloy | 395/51 |
| 5,797,135 A | * | 8/1998 | Whalen et al. | 706/45 |
| 5,806,060 A | * | 9/1998 | Borgida et al. | 707/3 |
| 6,029,043 A | * | 2/2000 | Ho et al. | 273/432 |
| 6,138,145 A | * | 10/2000 | Kawanaka | 709/204 |
| 6,236,989 B1 | * | 5/2001 | Mandyam et al. | 707/4 |
| 6,260,059 B1 | * | 7/2001 | Ueno et al. | 707/10 |
| 6,321,348 B1 | * | 11/2001 | Kobata | 714/37 |
| 6,477,531 B1 | * | 11/2002 | Sullivan et al. | 707/10 |

* cited by examiner

Primary Examiner—Meng-Al T. An
Assistant Examiner—Kenny Lin
(74) Attorney, Agent, or Firm—Law Offices of Terry McHugh (57) ABSTRACT

Method of providing technical support using an expert system including exchanging information between the system and the computing devices in a conversational format utilizing the Internet. The expert system is connected to a knowledge base having data relevant to diagnosing operating conditions of at least one product. The knowledge base may have a tree-like arrangement of rules in which each rule includes a number of antecedents and a solution. Incoming text strings to the expert system are free-form descriptions of the operating conditions of the product for which technical support is sought. The outgoing text strings include questions strings and solutions strings, and the identification of user options, which may include requests for explanations and/or summaries of the session progress. Deduction and induction are employed to identify a rule which includes a solution that resolves the problem experienced by the user who is engaged in a session.

15 Claims, 5 Drawing Sheets

INTERNET EXPERT SYSTEM AND METHOD USING FREE-FORM MESSAGING IN A DIALOGUE FORMAT

TECHNICAL FIELD

The invention relates generally to systems and methods for providing technical support for a product and more particularly to providing an easily accessible means for interacting with an automated technical support capability.

DESCRIPTION OF THE RELATED ART

Traditionally, technical support has been provided by direct communication between a user of a product and an individual having training regarding the product. The product may be goods (e.g., an automobile) or may be services (e.g., banking services). When the product is easily transported, the user and the "expert" may engage in a face-to-face meeting in which the user describes symptoms of a particular problem, so that the expert can determine the solution. On the other hand, technical support for items such as computers is typically conducted over telephone connections. Regardless, a heuristic approach to problem solving is typically employed. That is, the user will describe the problem and the trained individual will ask specific questions targeted to topics mentioned in the description. The trained individual may ask the user to identify operations which work and operations which do not. The questioning proceeds with a goal of identifying the solution.

The traditional approach has been at least partially automated in some technical support facilities. U.S. Pat. No. 5,678,002 to Fawcett et al. describes a product support center that utilizes interactive voice response (IVR) systems. A user of a product of interest employs the touch-tone keys on a telephone to respond to specific queries. For example, if the center is dedicated to providing support for computers, the automatically generated query may request identification of the type of the computer and may make requests for information that can be used to determine whether an operating system component is up-to-date. Then, when a product support engineer becomes available, the previously gathered information is available to the product support engineer. Moreover, the telephone connection between the user and the engineer is shared by a connection between the computers of the engineer and the user. Automated programs exchange diagnostic and remedial data over the telephone connection, so that additional information is available to the engineer. If it is determined that the user requires a fix or a patch, the fix or patch can be downloaded to the user's computer.

Another automated technique is sometimes referred to as an artificial intelligence system or an expert system. Automation techniques of this type are described in U.S. Pat. Nos. 5,444,823 to Nguyen and 5,787,234 to Molloy. Three types of systems are identified. In a rule-based system, IF-THEN rules may be chained forwardly and backwardly to enable reasoning that leads to a solution to a problem. In this rule-based system, knowledge is arranged in a series of rules, each consisting of an IF part and a THEN part. The IF part lists a set of conditions in some logical combination. When the IF part of a rule is satisfied, the THEN part can be concluded.

A second type of expert system is referred to as a case-based system. In this type, knowledge is arranged in a knowledge base as a series of discrete record entities, commonly referred to as "cases." There may be a case for each problem that is to be addressed. Each case may be structured to include a title, a descriptive field, a list of questions and answers, and a solution. During a technical support operation, an individual is required to type in a description of a symptom of the problem. Using the description, the system scans all of the questions residing in the knowledge base and returns with a list of questions to be answered by the individual. Based upon the answers to the questions, the system narrows the search to a solution identified in one of the cases.

The third type of system is referred to as a neural network. Neural networks are designed to simulate biological learning from experience. Measures of associations between ideas are formed based upon situations. Rather than a program that forms a logical tree, the system continuously compares situations, noting what items are associated with one another and how strongly they are associated. Strong associations are represented by high-valued mathematical weights, while weak associations are represented by low-valued weights. Neural networks are more successful in pattern recognition applications such as handwriting analysis, but have found some applications in the technical support environment.

A concern with the known expert systems is that efficient use of the systems requires a high degree of sophistication in at least one area. As noted in the Nguyen patent, if an end-user of a product requires technical support for the product, it is entirely possible that the end-user will be unable to fully understand the process. For example, if questions are presented to the end-user, an improper answering of the question could impede the expert system from properly diagnosing the problem. Consequently, expert systems are often used within a "help desk" environment in which the actual operator of the device is a product support engineer who is in telephone contact with the end-user. The engineer relays the questions generated by the expert system to the end-user. Since the engineer is more familiar with both the expert system and the knowledge base, unclear or difficult questions can be explained to the end-users. For this reason, the expert systems are not installed directly onto the computer systems of the end-users.

What is needed is a method and system for providing technical support such that diagnostic information is easily accessible and is exchanged in an approach that enables efficient diagnostic processing even when employed by occasional users.

SUMMARY OF THE INVENTION

A method of providing technical support using an expert system includes enabling Internet connectivity between the expert system and remote computers and includes exchanging information between the system and the computers in a conversational format. The expert system is connected to memory that includes a knowledge base having data relevant to diagnosing operating conditions of at least one product. Preferably, the knowledge base defines a tree arrangement of rules in which each rule includes a solution and at least one related antecedent that represents the condition which indicates the appropriateness of the solution. In the most preferred embodiment, each solution is related to at least three antecedents. Free-form descriptions of operating conditions of the product are provided by the user at one of the remote computers and are used to identify rules and to deduce a solution. Moreover, induction to a solution may be achieved by transmitting an outgoing question from the system to the remote computer, with the content of the question being a request to confirm the existence of a particular antecedent (i.e., a particular operating condition).

By implementing the expert system on a WWW (World Wide Web) server, the number of connections is only limited by the resources of the server. Consequently, independent and concurrent sessions may be conducted with a number of remote computers. The conversational format that is used in each session preferably includes transmitting outgoing text strings to the remote computers and receiving incoming text strings from the computers. Within a particular session, the incoming text strings include free-form descriptions of the operating conditions of a product of interest. The outgoing text strings include question strings and solution (resolution) strings. The exchange of incoming and outgoing text strings is intended to take a heuristic approach to problem solving. A free-form description of operating conditions of the product of interest is read at the expert system and is used to correlate the description with rules of the knowledge base. Outgoing question strings are transmitted to induce further information that is used to correlate free-form description with rules, until a specific resolution is identified. The resolution is then transmitted to the remote computer in a resolution string.

The user preferably has a number of options when engaged in a session at the Internet-connected remote computer. The user may drive the direction of "conversation" by describing the operating conditions of the product of interest. Alternatively, the user may allow the system to drive the conversation flow. For example, the user may enter a text string having the contents of "STOP" in order to trigger the system to generate a series of question strings. By driving the conversation, the system is allowed to use induction to acquire information for identifying the correlation between operating conditions and a particular rule that specifies a resolution. As another option, the user may request an explanation for a particular question within a question string. Thus, at any point in the conversation, the user is authorized to demand an "explanation." Yet another option available to the user is the right to generate a text string requesting a summary of all of the facts that were previously reached within the session. Upon receiving an incoming text string requesting a summary, the system replies with a list of all of the known facts. Other available options include allowing a user to browse the knowledge base manually and allowing the user to request intervention by a company representative.

The components of the system may be formed in a combination of computer hardware and software. The components include an initialization module which is responsible to open data files and to create a representation of the knowledge base in memory. A read known facts module interacts with the user and allows the user to enter as many facts as desired. This module attempts to match the facts with the antecedents in the knowledge base. If successful, the antecedent is verified as a known fact. A deduction module is responsible to apply a forward chaining algorithm on the known facts. This is accomplished by parsing the knowledge base and attempting to correlate any of the rules with the known facts. If a rule is confirmed, the resolution stored in the rule is presented to the user as the solution to the problem.

If there are known facts but no correlation with a rule is identified, a first induction module may attempt to apply a backward chaining algorithm on the known facts. That is, the module may attempt to confirm rules that have at least one other antecedent that is confirmed. Thus, if two of the three antecedents that are associated with a rule have been confirmed, the first induction module may transmit a question string that requests the user to confirm the presence of the third antecedent. If the user provides the confirmation, the rule is confirmed and the resolution is transmitted in an outgoing solution string to the user. One advantage of this implementation is that it can take advantage of additional information that the user may offer in response to the question string.

A second induction module employs the same backward chaining algorithm on the knowledge base in general, rather than on the known facts. This approach is most beneficial when the system cannot associate anything in the knowledge base with the information described by the user. To avoid discouraging the user with numerous questions, the second induction module takes advantage of the tree-like structure of the knowledge base and proceeds systematically by category. The question strings transmitted to the user become more specific when the user confirms interest in a certain category.

Another component is a log that is maintained for each user session. A report generator may be programmed to provide statistics regarding the various sessions in which the system was able to provide a solution to a problem. The report information may then be employed to upgrade the system. The log may also be employed to track a session, allowing a user to resume the session at a later time. That is, the system is able to return to the point in the session at which the sequence was previously terminated.

While the preferred embodiment is one in which the exchange of information with a user is accomplished by means of text strings, the invention may be used with some variations. Specifically, the outgoing messages to the user may be audio files that are converted to audio messages at the computer of the user. Transmitting audio files via the World Wide Web is known in the art. Alternatively, the messages may be a combination of audio and text files.

DETAILED DESCRIPTION

Figure 1:
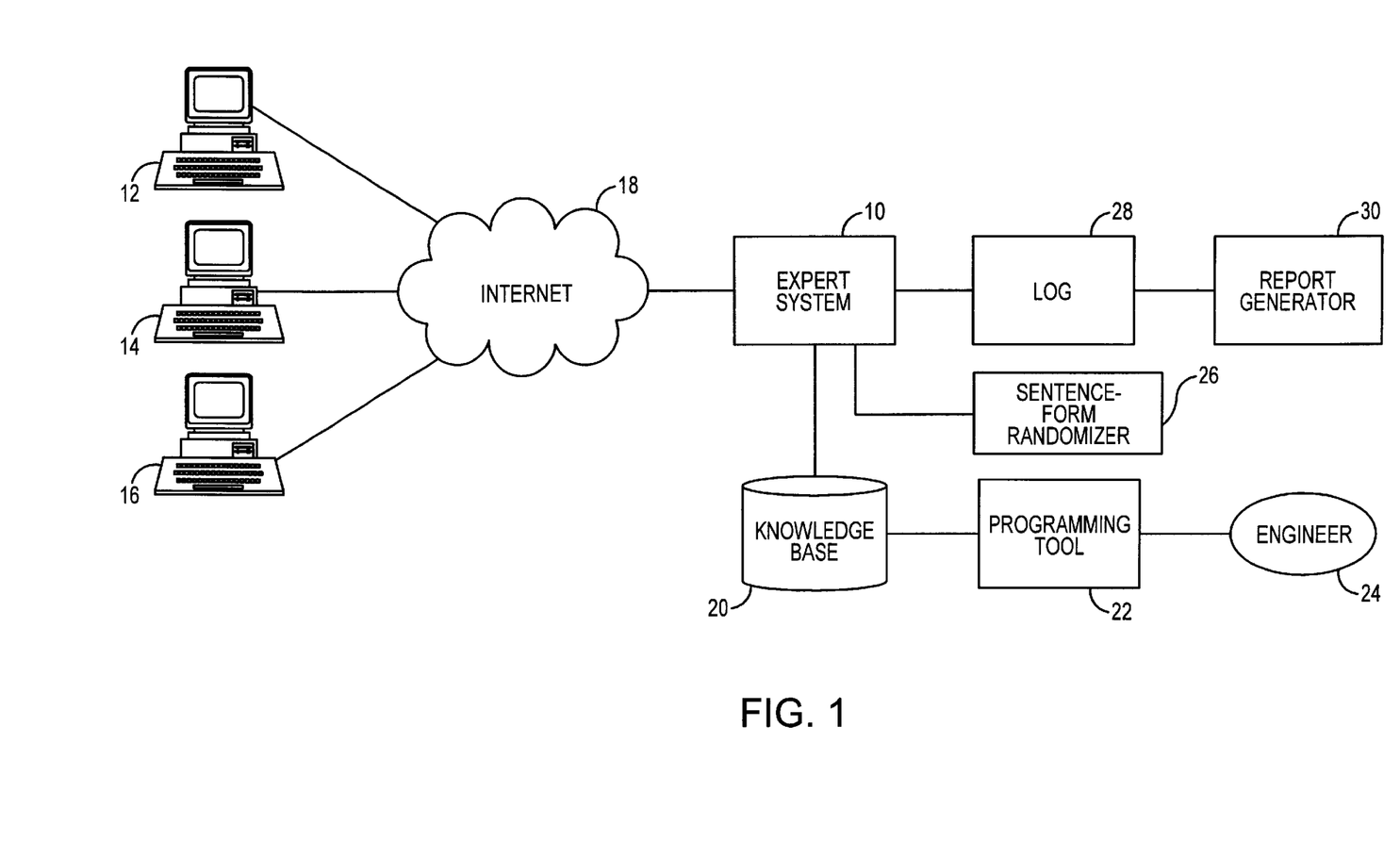
FIG. 1 is a block diagram of components of an Internet expert system using dialogue formatting in accordance with the invention.

With reference to FIG. 1, an expert system 10 is shown as being accessible by remote computers 12, 14 and 16 via the global communications network commonly referred to as the Internet 18. The expert system is intended to provide technical support for one or more products, such as a particular make of automobile. As will be described more fully below, the sessions between the expert system and the remote computers are conducted in a conversational format, i.e., a format that simulates dialog. The Internet connectivity preferably is via the World Wide Web (WWW), with the expert system being stored at a WWW server having a specified Universal Resource Location (URL).

The expert system 10 can be "trained" to be an expert on any product or group of products merely by forming and storing a knowledge base 20 that is specific to the product or product group. The knowledge base is a file that contains rules about the product. The rules include antecedents and solutions, as is known in the art. For example, if the expert system is used to provide technical support for a car of a particular make, the knowledge base will include the rules regarding the operations and characteristics of the car. Alternatively, the product may be a service, such as providing pre-sales service for a financial institution. In such an application, the knowledge base contains information about the operations and services provided by a bank or similar institution. The programming tool 22 for creating the knowledge base will be described below when referring to FIG. 4.

Using the programming tool 22, a technical support engineer, represented by reference numeral 24, forms a tree-like structure of rules in which each rule preferably includes three antecedents. The expert system 10 then implements a heuristic approach to problem solving. The approach is goal oriented, so that after a user of the product generates a description at one of the remote computers 12, 14 and 16, the expert system attempts to suggest a solution. If the initial description does not provide sufficient information, question text strings are generated and transmitted to the remote computer of the user. The hunt for a solution is based upon the information originally entered by the user during the description of the problem and upon the information entered by the user in response to the question text strings from the expert system. Deduction allows the expert system to reach a general truth (solution) from details provided by the user. Induction allows the expert system to provide a solution based upon confirmation of detailed facts.

Because the expert system 10 is accessible via the Internet 18, multiple connections can be formed simultaneously. The expert system does not impose any limitations on the number of concurrent sessions. Rather, the number of connections is limited by the resources of the WEB server on which the system is running. Another advantage of the connectivity via the Internet is that the expert system 10 is available on a twenty-four hour a day basis. If a user of a product for which technical support is provided has a browser application that provides access via the WWW, the user is able to contact the expert system 10 at any time.

Preferably, the expert system 10 and the knowledge base 20 are cooperative to enable the generation of question text strings in a number of alternative forms. That is, while the content of a question may be determined by the cooperation of the expert system and the knowledge base, the phrasing of the content of that question may be determined by a sentence form randomizer 26. The randomizer is shown as a separate component, but is typically carried out in computer software. The engineer 24 uses the programming tool 22 to define a number of alternative expressions of the question. During sessions, the randomizer 26 selects one of the available expressions of the question. This enhances the simulation of human conversation when a user at one of the remote computers 12, 14 and 16 engages in a technical support session.

The components of the system also include a session log device 28 that maintains logs of each session. A report generator 30 is used to derive statistical analysis from the logs. For example, the generator 30 may report statistics about the number of sessions in which the expert system 10 was able to provide a solution to a problem. This information can then be used as a retrofit to the system, thereby rendering the system "smarter." Moreover, the knowledge base 20 and the report generator 30 may be cooperative to create other types of database reports. For example, the system engineer 24 may simply input, "Prepare a sales report for Q2-99," triggering the system to proceed with a command sequence to prepare the requested database information.

In the preferred embodiment, the information within the log device 28 enables session resumption. That is, the conversation is tracked throughout a distinct session and the determination is bookmarked, so the user can return to the termination point in the session at a subsequent time. This allows the user to log off from the connectivity with the expert system 10 in order to implement a suggested solution and to subsequently resume the session if the suggested solution does not resolve the problem. This resumption feature may be particularly useful for applications in which the product for which technical support is sought cannot be brought to the computer (e.g., technical support for an automobile).

Figure 2:
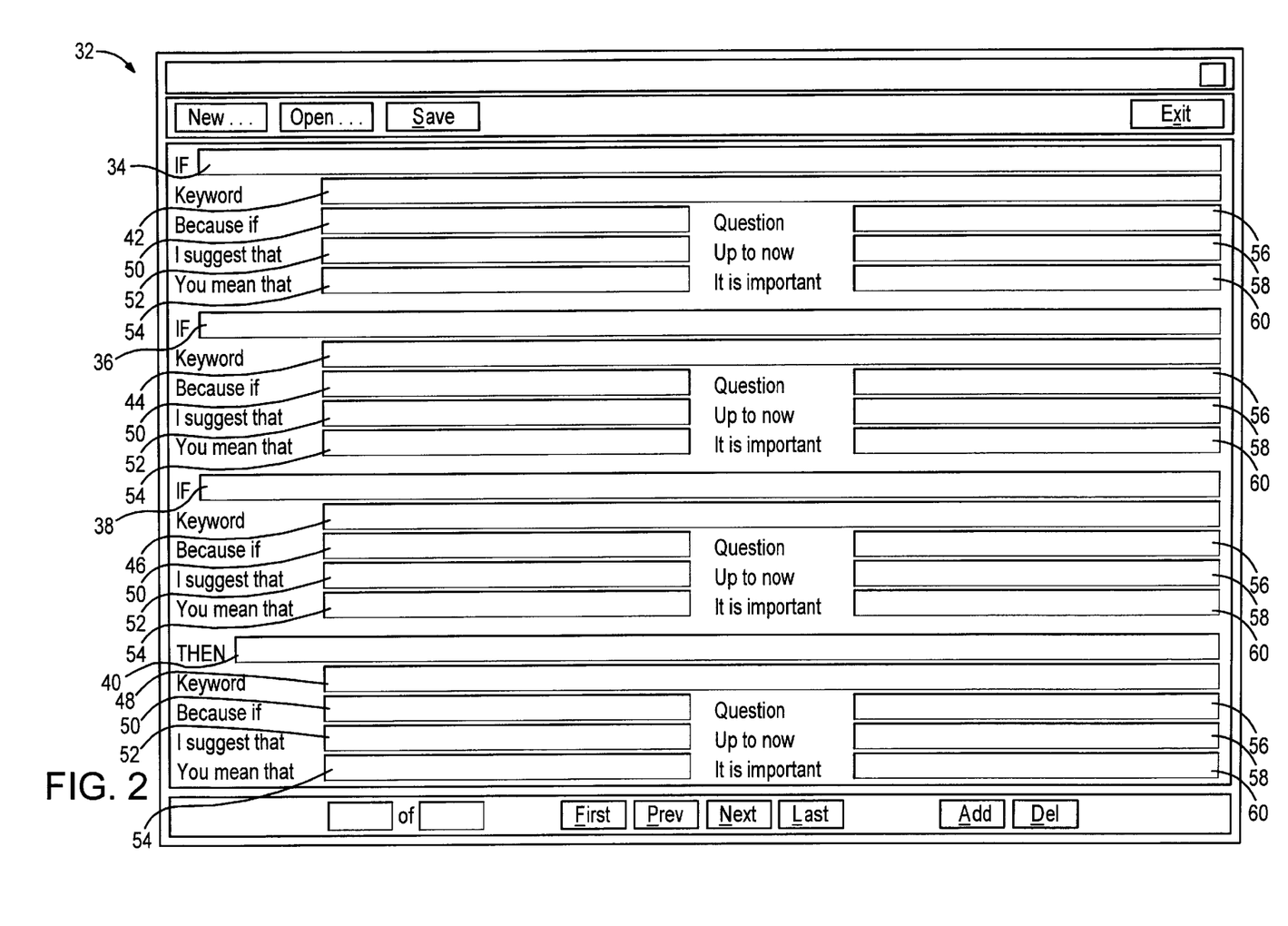
FIG. 2 is an interface screen for a programming tool that may be used to form the knowledge base for FIG. 1.

FIG. 2 illustrates an exemplary screen interface 32 that is used by a system engineer 24 to enter rules into the knowledge base 20. The screen interface 32 represents one page of the programming tool 22 and is used to dictate one rule of the knowledge base 20. In the preferred embodiment of the invention, each rule includes three antecedents and one solution. The antecedents are entered into the "IF" lines (fields) 34, 36 and 38. The solution is input on the "THEN" line 40. When the known facts within a particular session indicate the existence of all three antecedents, the resolution is determined to be relevant.

During a session, free-form description is provided by the user who seeks technical support for a particular product. A keyword search can then be implemented to select among rules that are potentially relevant. During the creation of the knowledge base 20, the keyword lines 42, 44, 46 and 48 allow the engineer 24 to enter descriptors that provide the basis for the searching capability. Implementing the searching capability is known in the art.

Associated with each antecedent of a particular rule is a number of fields that contain the alternate expressions for the antecedent. In FIG. 2, the expressions are entered at fields 50, 52, 54, 56, 58 and 60. For example, one of the fields contains the negative form of the antecedent, while another field provides the interrogatory form. This architecture allows the expert system 10 and the sentence-form randomizer 26 to select a particular form, while conversing with the user. Moreover, the meaning of a question string that is transmitted to a user may remain the same, but the format changes, making the system appear to be more human like. The first time that a question is presented, the question may be phrased as, "Is it correct that the battery is changed?" and the second occurrence may be phrased as, "You mean that the battery is changed?"

Also in the preferred embodiment, the user seeking technical support is provided with the option of requesting an explanation for a question presented by the expert system 10. The "Because if" field 50 and the "It is important" field 60 may be used by the system engineer 24 to enter the explanations that will be presented to the user. The solution that is part of the rule is contained within the "I suggest that" field 52 below the "THEN" field 40.

Figure 3:
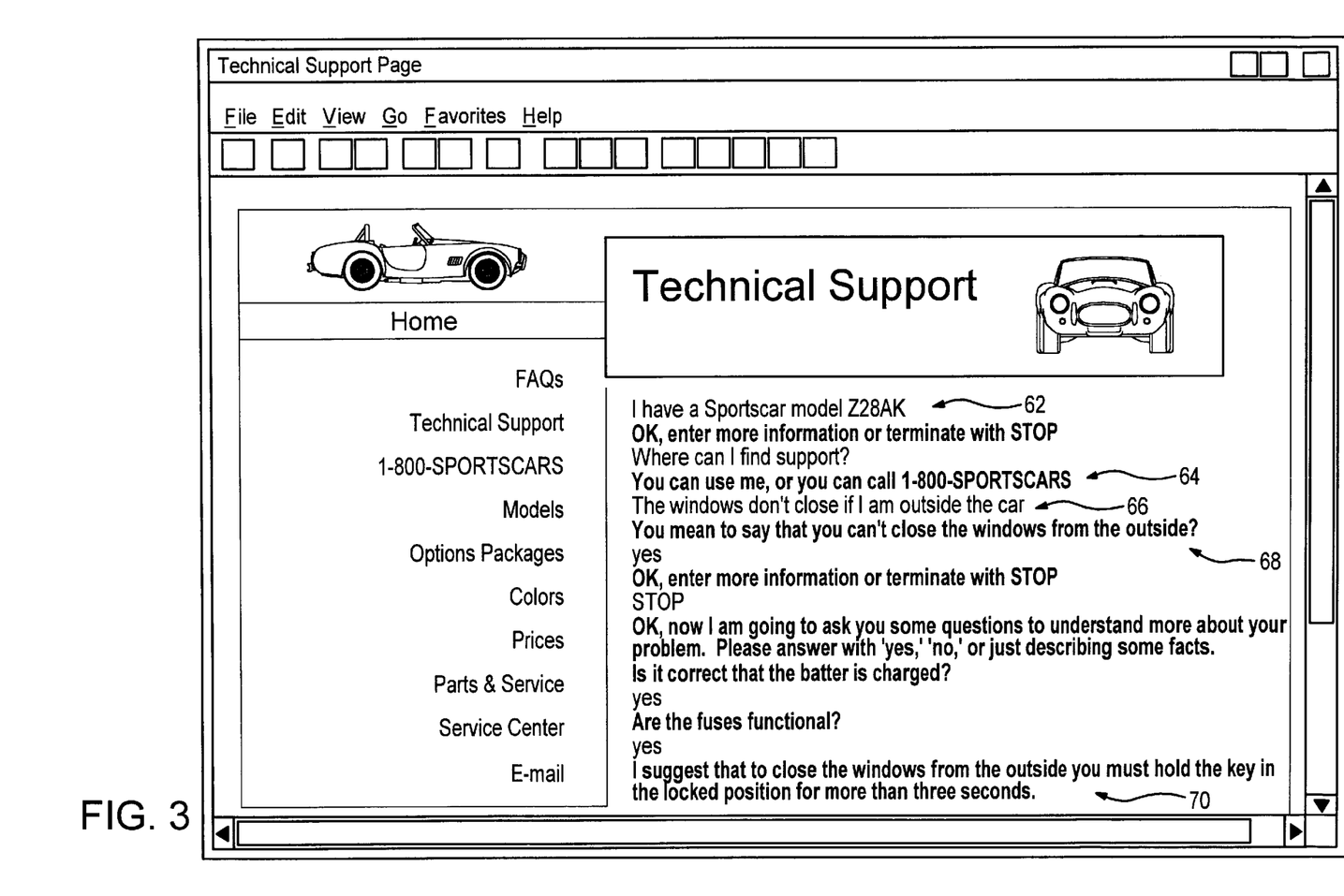
FIG. 3 is an example of a user session presented at a computer of a user attempting to find a solution to a particular problem.

Referring now to FIG. 3, an example of a user session as it appears at one of the remote computers 12, 14 and 16 is shown. Users visiting the WEB site can interact with the expert system 10 via the Internet 18, as indicated in FIG. 1. Technical support is available for specific goods or services. In the example of FIG. 3, the product of interest is an automobile. In a text string that is transmitted from the remote computer 12 of the user to the expert system 10, the user identifies the make and model of the automobile, as indicated at text line 62 in FIG. 3. The system then generates and transmits a request string for additional information. When the user responds with "Where can I find support?", the system identifies two options, as indicated at text line 64.

The user may enter and transmit a text line 66 that is a free-form description of the problem. By "free-form," what is meant is that the user is not restricted to any sentence form or any dictated vocabulary. Here, the text string entered by the user is, "The windows don't close if I am outside the car." The system then performs a keyword search to identify an appropriate rule that applies to the free-form description of the problem. When a rule is identified, the system generates a question string that is transmitted to the user. The question string is in one of the sentence forms entered by the system engineer 24 using the screen interface 32 of FIG. 3. As will be explained when referring to FIG. 4, the system uses deduction and induction of known facts to confirm rules. In FIG. 3, the system phrases the question in line 68 to request confirmation. After the confirmation is received, the system requests additional information, but also identifies the option of entering the term "STOP." By entering this term, the user indicates that he or she would prefer that the system drive the direction of conversation. When the term is entered, the system uses induction to proceed with the goal-oriented session. A series of questions is then presented to the user in order to confirm the existence of other antecedents that indicate an appropriate resolution. If the presence of each antecedent is confirmed, a solution to the problem is presented, as indicated at text line 70 of FIG. 3.

Figure 4:
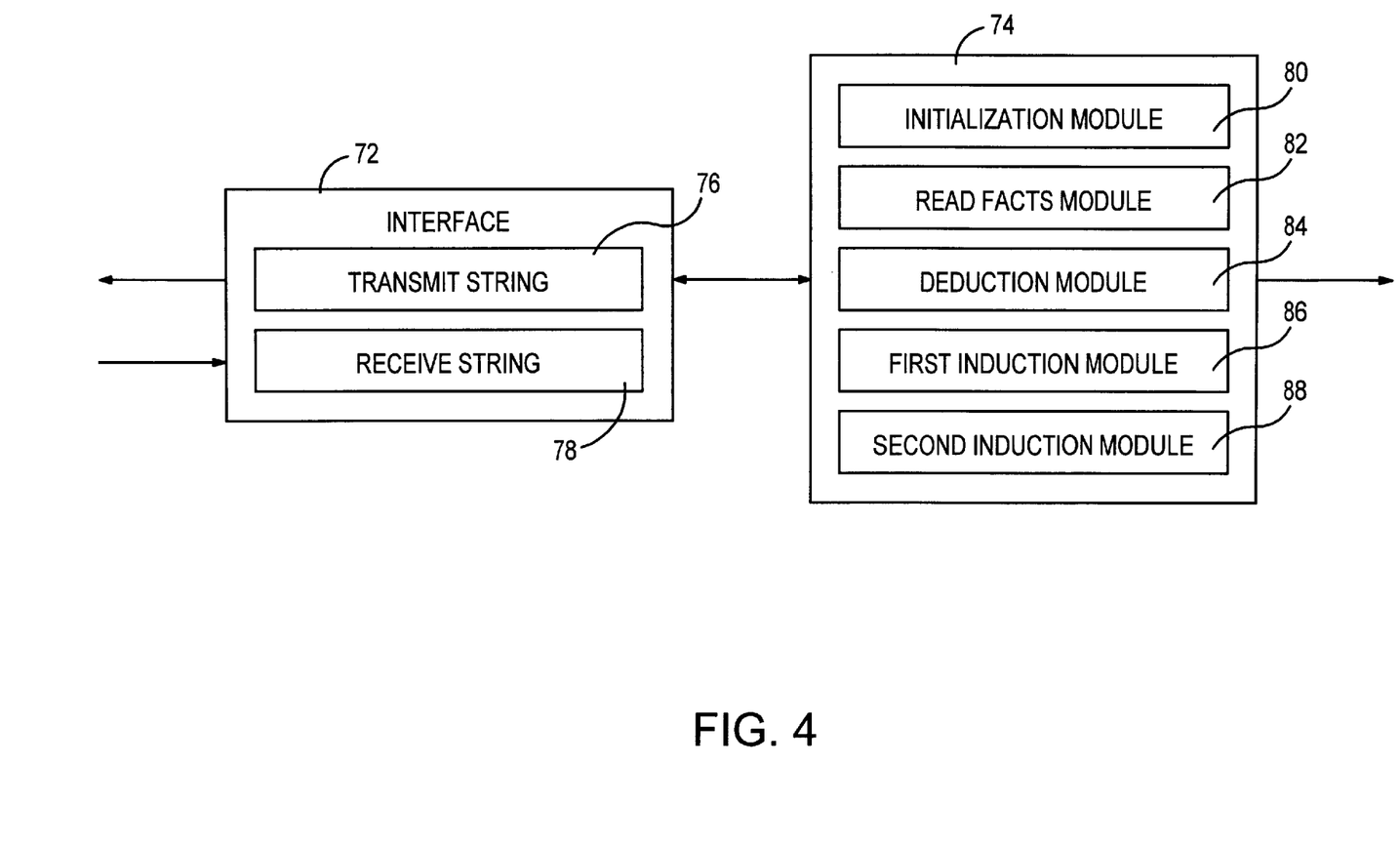
FIG. 4 is a block diagram of the components of the expert system shown in FIG. 1.

Referring now to FIG. 4, components of the expert system 10 of FIG. 1 include a user interface 72 and a knowledge base interface 74. The two interfaces are preferably carried out in computer software, and are the two main threads of execution of the expert system. The user interface 72 is responsible for communication with the users seeking technical support. The knowledge base interface 74 is responsible for implementing the deduction and induction algorithms that link information from the users with rules within the knowledge base.

Within the user interface, a transmit string module 76 sends the question strings, solution strings and any information to the users via the Internet. In a reverse direction, a receive string module 78 accepts transmissions from the users. Both the transmitted strings and the received strings are in a format compatible with transmission over the Internet. For example, HTML (Hyper Text Markup Language) templates or CGI (Common Gateway Interface) scripts may be used. Techniques for implementing the user interface 72 are known in the art.

The knowledge base interface 74 includes an initialization module 80. This module is responsible for opening data files and creating a representation of the knowledge base in memory. While not critical, a dynamic doubly linked list may be used. The module uses the user interface 72 to notify a user that he or she can start describing the problem.

A read facts module interacts with the user via the user interface and allows the user to enter as many facts as desired. The module attempts to match the facts with the antecedents in the knowledge base. If it is successful, the antecedent is verified as a known fact. The deduction module 84 is responsible for applying a forward chaining algorithm on the known facts that are entered by the user. To accomplish this, the algorithm parses the knowledge base and attempts to confirm any of the rules that include these known facts as antecedents. If a rule is confirmed, the conclusion stored as part of the rule is presented to the user as the solution to the identified problem.

The first induction module 86 is utilized if the conclusion is not reached by means of the deduction module 84. The first induction module applies a backward chaining algorithm on the known facts. In this case, the expert system attempts to confirm rules that have at least one confirmed antecedent, which means that the rule already contains a known fact. For example, if the expert system has employed its searching capability to identify a rule in which two of the three antecedents have already been verified, the expert system will request that the user confirm the existence of the third antecedent of the rule. If the user provides confirmation in response to a question string, the expert system tags the rule as having one solution. One thing that is peculiar to the implementation of the invention is that the system takes advantage of additional information that the user may offer when the user is answering a question string. For example, if the system transmits a question string that asks "Is the battery charged?" but the user answers "I don't know, but the fuses are OK," the expert system enters this new fact in the known facts. The deduction module 84 is then used to reapply the forward chaining algorithm, just in case the new piece of information identifies a new rule.

The second induction module 88 takes advantage of the same backward chaining algorithm as the first induction module 86. However, the second induction module applies the algorithm to the knowledge base in general, rather than merely to the known facts. This approach is generally needed when the expert system cannot associate anything in the knowledge base with anything described by the user. To avoid a session in which the system sends a large number of questions that do not appear to be focused, the expert system may take advantage of the tree-like structure of the knowledge base and proceed by category. The questions become more specific when the user confirms interest in a certain category of the tree-like structure of the knowledge base.

Figure 5:
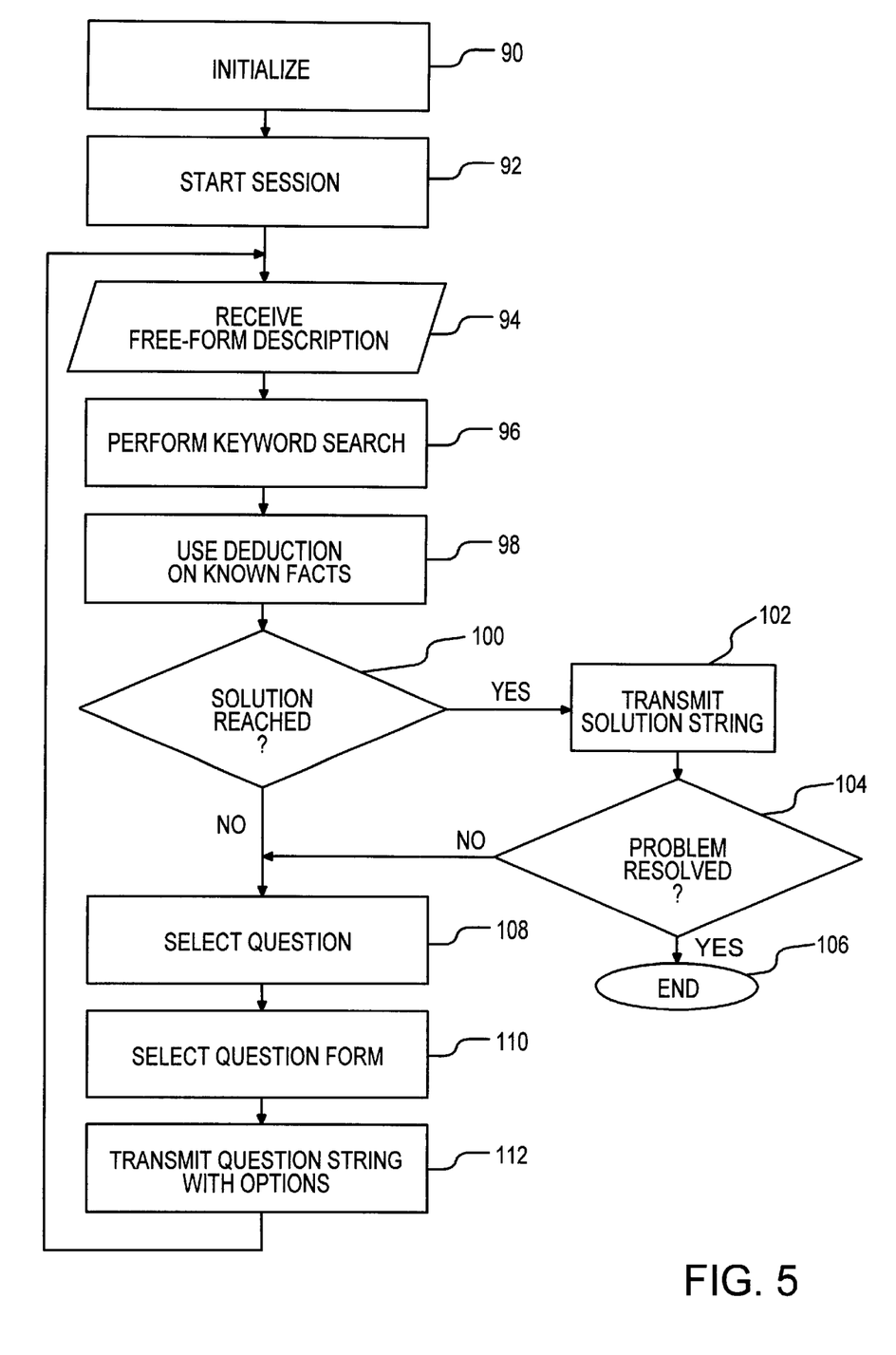
FIG. 5 is a process flow of steps that are implemented during a session using the components of FIGS. 1 and 4.

FIG. 5 is a typical process flow of steps for implementing a session using the technical support system and method described above. In step 90, the initialization module 80 of FIG. 4 creates a representation of the knowledge base in memory. In step 92, the session with a particular user begins. The user enters a free-form description of the problem that is to be resolved, as indicated at step 94. The content of the description provides a basis for performing a keyword search and for using deduction on known facts, in steps 96 and 98. As previously noted, the deduction on known facts is accomplished by applying the forward chaining algorithm on the known facts entered by the user.

In decision step 100, it is determined whether the deduction step 98 indicated a particular rule of the knowledge base. If so, the solution that is contained within the rule is transmitted in a solution string at step 102. The solution string provides the information that is indicated as being the resolution to the problem faced by the user. In the optional step 104, the process may include determining whether the problem has been resolved. This is typically performed by a question-and-response sequence between the expert system and the user. If the problem is resolved using the solution from the rule, the process ends at step 106. On the other hand, if the suggested solution does not resolve the problem, a question is selected at step 108. Similarly, if no solution was determined to have been reached at step 100, the process proceeds to step 108. The backward chaining algorithm may be used in step 108 to select a question. The question may be based upon induction on known facts or upon induction on the knowledge base, as indicated above. The question form is selected in step 110. The sentence-form randomizer 26 of FIG. 1 executes step 110. Then, in step 112, the question string is transmitted, along with options available to the user.

The options that are identified to the user in the transmission step 112 include allowing the user to designate the expert system as the driving force of the conversational flow. For example, as noted with reference to FIG. 3, a text string may notify a user that entering the term "STOP" will transfer the driving capability to the system. As also shown in FIG. 3, the user may enter "Why" or "Summary." By entering the term "Why" the user requests an explanation for a particular question. By the entering the term "Summary" the user requests a summary of all of the facts that were previously reached within the session. Upon receiving an incoming text string requesting the summary, the expert system 10 replies with a list of all of the known facts. Other available options include allowing a user to browse the knowledge base manually and allowing the user to request intervention by a company representative.

While the invention has been described and illustrated with respect to the transmission of text strings to the users at the remote computers 12, 14 and 16, this is not critical. Alternatively, the messages to the users may be audio files that are transmitted via the Internet 18 for audibilization at the remote computers. As another alternative, the messages may be combinations of audio and text files.

What is claimed is:

1. A method of providing technical support comprising steps of:

Storing a knowledge base in memory, including defining a tree arrangement of rules relating to said operating conditions, said rules including relationships between resolutions and antecedents of said resolutions, said knowledge base having data relevant to diagnosing operating conditions of at least one product;

Connecting said memory to an expert system for correlating resolutions to specific operating conditions and inputs that identify said specific operating conditions as applied to said at least one product;

Enabling Internet connectivity between said expert system and remote computing devices of users of said at least one product, including enabling a plurality of independent and concurrent sessions in which information is exchanged between said expert system and said remote computers in a conversational format, each said session being unrelated to the other said sessions concurrently being conducted and comprising steps of:

(a) transmitting outgoing text strings to a particular remote computer, said outgoing text strings being selected in an absence of human intervention and including question strings and resolution strings;

(b) receiving incoming text strings from said particular remote computer, said incoming text strings including free-form descriptions of operating conditions of said at least one product; and (c) correlating said free-form descriptions within said incoming text strings and said data of said knowledge base including identifying indications of said antecedents contained within said incoming text strings from said particular remote computer, wherein during execution of said correlating, said step of transmitting resolution strings include basing content of said resolution strings upon identification of correlations wherein said steps of transmitting and correlating enable forward deducing from an indication of a first antecedent to a related first resolution and enable backward inducing in which an outgoing question string is transmitted to request confirmation of presence of a second antecedent that is also related to said first resolution, said second antecedent having been previously unidentified in any said incoming text string.

2. The method of claim 1 wherein said step of transmitting outgoing text strings includes transmitting explanation strings that are each responsive to an explanation request from said particular remote computer and that are each indicative of a rationale for selecting and transmitting a question string that was previously transmitted to said particular remote computer.

3. The method of claim 1 further comprising steps of maintaining a log of each said session and generating reports regarding said sessions, such that said reports may be utilized to enhance performance of said expert system.

4. The method of claim 1 further comprising a step of transmitting a summary to each said remote computer from which a summary request is received during one of said sessions.

5. The method of claim 1 wherein said step of enabling Internet connectivity includes providing browser-based access via the World Wide Web (WWW).

6. The method of claim 1 wherein said step of storing said knowledge base includes providing data related to operating conditions for a specific service, said specific service being said product.

7. A method of providing technical support comprising steps of:

forming a knowledge base in memory, including defining a tree arrangement of rules in which each rule includes a solution and at least one related antecedent that represents a condition which indicates appropriateness of said solution;

enabling access to said memory via the World Wide Web, including enabling computer-executed exchanges that include:

(a) receiving free-form messages having descriptive content indicative of conditions of a product of interest;

(b) electronically reading said free-form messages;

(c) determining whether said free-form messages describe conditions that are representative of one of said antecedents within said tree arrangement;

(d) if a match is identified between a specific antecedent and description of conditions within a particular free-form message, transmitting a signal that presents a grammatically correct solution message at a source of said particular free-form message, said solution message being formed to propose the solution to which said specific antecedent is related;

(e) if a match is not identified between an antecedent and said description of conditions, transmitting a signal that presents a grammatically correct question message at said source, including selecting said question message based upon inducing additional description in a responsive free-form message from said source; and (f) repeating steps (a)–(e) for said responsive free-form message;

wherein said steps (a)–(f) are implemented to simulate a dialogue and are executed in an absence of human intervention.

8. The method of claim 7 wherein said step of selecting said question message includes selecting a question content and selecting from a plurality of available options for phrasing said question content, said selecting from said available options being implemented to provide variety in presentations of said question messages.

9. The method of claim 7, further comprising steps of logging each session with sources of said free-form messages and enabling a particular session to subsequently resume following a termination of said steps (a)–(f).

10. The method of claim 7 wherein said steps (a)–(f) are implemented such that said exchanges are in a format compatible with communications with WWW browser applications at sources of said free-form messages.

11. A system for providing product support by exchanges of messages that simulate free-form dialogue comprising:

memory having a stored knowledge base that defines a tree arrangement of rules, said rules having solutions and having antecedents which are related to said solutions;

means for communicating incoming and outgoing text strings in a format compatible with transmissions via the World Wide Web (WWW);

reading means for receiving said incoming text strings via said communicating means and for recognizing contents of said incoming text strings, said reading means having a sufficiently large search vocabulary to enable said incoming text strings to be free-form messages;

deduction means connected to said reading means and said memory for detecting correlations between said contents of said incoming text strings and said rules; and message means for transferring said outgoing text strings to said communicating means in response to operations of said deduction means, said outgoing text strings including solution messages that identify solutions when correlations are detected between said contents of said incoming text strings and said rules, said message means being enabled to transfer a specific induction message to said communicating means in response to a determination at said deduction means that confirmation of a correlation is required, said specific induction message being representative of a question having content which is intended to acquire said confirmation.

12. The system of claim 11 further comprising a means for logging sessions of said incoming and outgoing text strings with specific remote computers.

13. The system of claim 12 wherein said deduction means and said logging means are cooperative to enable resumption of a specific session subsequent to a first termination of said specific session.

14. The system of claim 11 wherein said deduction means and said message means are cooperative to trigger one of said specific induction messages requesting confirmation of a second antecedent to a particular rule when a preceding incoming text string is read to confirm a first antecedent of said particular rule.

15. The system of claim 11 wherein said reading means, deduction means and message means are implemented in computer software that includes a read module, a deduction module and an induction module.

* * * * *